US011915397B2

(12) United States Patent
Csefalvay et al.

(10) Patent No.: US 11,915,397 B2
(45) Date of Patent: Feb. 27, 2024

(54) RENDERING AN IMAGE OF A 3-D SCENE

(71) Applicant: Imagination Technologies Limited, Kings Langley (GB)

(72) Inventors: Szabolcs Csefalvay, Hertfordshire (GB); James Imber, Hertfordshire (GB); David Walton, Hertfordshire (GB); Insu Yu, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/956,925

(22) Filed: Sep. 30, 2022

(65) Prior Publication Data
US 2023/0177769 A1 Jun. 8, 2023

(30) Foreign Application Priority Data

Sep. 30, 2021 (GB) ........................... 2114029
Sep. 30, 2021 (GB) ........................... 2114030
Sep. 30, 2021 (GB) ........................... 2114031

(51) Int. Cl.
*G06T 5/00* (2006.01)
*G06T 5/20* (2006.01)
*G06T 5/50* (2006.01)
*G06T 15/06* (2011.01)
*G06T 15/50* (2011.01)
*G06T 3/40* (2006.01)

(52) U.S. Cl.
CPC ............ *G06T 5/002* (2013.01); *G06T 3/40* (2013.01); *G06T 5/20* (2013.01); *G06T 5/50* (2013.01); *G06T 15/06* (2013.01); *G06T 15/506* (2013.01); *G06T 2207/20016* (2013.01); *G06T 2207/20212* (2013.01); *G06T 2207/20221* (2013.01)

(58) Field of Classification Search
CPC .. G06T 5/002; G06T 5/20; G06T 5/50; G06T 3/40; G06T 15/005; G06T 15/06; G06T 15/50; G06T 15/506; G06T 2207/20016; G06T 2207/20212; G06T 2207/20221
See application file for complete search history.

(56) References Cited

U.S. PATENT DOCUMENTS

2017/0032500 A1   2/2017  Csefalvay
2017/0206700 A1*  7/2017  Munkberg ............ G06T 15/005
(Continued)

FOREIGN PATENT DOCUMENTS

GB          2541179 A      2/2017

OTHER PUBLICATIONS

Kopf et al; "Joint Bilateral Upsampling"; ACM Transactions on Graphics, vol. 26, No. 3; Article 96; Jul. 29, 2007; pp. 96-6.
(Continued)

*Primary Examiner* — Daniel F Hajnik
(74) *Attorney, Agent, or Firm* — Potomac Law Group, PLLC; Vincent M DeLuca

(57) ABSTRACT

A method of rendering an image of a 3-D scene includes rendering a noisy image; and obtaining one or more guide channels. For each of a plurality of local neighbourhoods, the method comprises: calculating the parameters of a model that approximates the noisy image as a function of the one or more guide channels, and applying the calculated parameters to produce a denoised image. Tiling is used when calculating the parameters of the model.

20 Claims, 10 Drawing Sheets

(56) References Cited

U.S. PATENT DOCUMENTS

2017/0278224 A1\* 9/2017 Onzon ................... G06T 5/002
2020/0396398 A1\* 12/2020 Romanenko .............. G06T 5/50

OTHER PUBLICATIONS

Magalhaes et al; "Interactive Monte-Carlo Ray-Tracing Upsampling"; Eurographics 2016; Retrieved from the Internet: URL:https://diglib.eg.org/bitstream/handle/10.2312/egp20161048/023-024.pdf?sequence=1&isAllowed=y ; pp. 23-34.

Bauszat et al., "Guided Image Filtering for Interactive High-quality Global Illumination," Eurographics Symposium on Rendering 2011, vol. 30, No. 4, 2011.

He et al.,"Guided Image Filtering," Computer Vision—ECCV 2010. Lecture Notes in Computer Science, vol. 6311, Springer, 2010.

He et al., "Guided Image Filtering," IEEE Transactions on Pattern Analysis and Machine Intelligence, vol. 35, No. 6, pp. 1397-1409, Jun. 2013.

Liu et al., "Denoising Monte Carlo Renderings based on a Robust High-Order Function," Proceedings of the 13th International Joint Conference on Computer Vision, Imaging and Computer Graphics Theory and Applications, pp. 288-294, Jan. 2018.

Tsubokawa et al; Tiling Parallelization of Guided Image Filtering: URL:https://fukushima.web.nitech.ac.jp/paper/2019_fcv_tsubokawa.pdf; 2 pages, 2019.

Yang et al; "Structure adaptive anisotropic image filtering"; Image and Vision Computing; vol. 14; No. 2; Mar. 1, 1996; pp. 135-145.

\* cited by examiner

RENDERING AN IMAGE OF A 3-D SCENE

BACKGROUND

Path-tracing is a Monte Carlo method for approximating the light transport in a scene. The quality of the result depends on the number of samples per pixel—the greater the number of samples, the better the result approximates the actual light transport.

However, increasing the number of samples is computationally expensive, especially since the standard deviation of the noise is related to the number of samples N by a factor $1/\sqrt{N}$. This means that four times as many samples are necessary to achieve a 50% reduction in noise. Consequently, increasing the number of samples quickly becomes impractical as a way to reduce the noise in the path-traced image.

It is known that applying denoising algorithms can reduce the noise without increasing the number of samples. A "guided filter" has been found to work well in this task. Originally proposed by He et al., the guided filter models each neighbourhood of a noisy image as an affine transform of a corresponding neighbourhood of a guide image. The guide image should be noise free and should contain scene structure (for example, object edges, occlusion boundaries or shadow edges) corresponding to the noisy image. Such guide images are available in the context of path-tracing, because the scene is synthetic and various "auxiliary" images of it can be rendered by other means. A guide image with several guide channels may be used in a guided filter, and each guide channel may contain different kinds of information useful for reconstructing a noise-free image (for example, a depth channel and surface normal channels). Different combinations of guide channels may be useful in different parts of the image; for this reason, the method is referred to as a local linear (or, more correctly but less commonly, a local affine) model.

Because it is guided by information about the structural content of the scene, the guided filter can denoise a noisy path-traced image of the scene without causing significant blurring across object edges within the image, provided suitable structural information is available in one or more of the guide channels.

It would be desirable to improve the quality of the denoising, and to implement it more efficiently, in order to better support path-tracing—in particular, to allow path-tracing to be performed at higher framerates and/or at better quality on devices with limited computational resources and power, such as mobile devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of rendering an image of a 3-D scene is provided. The method comprises: rendering a noisy image; and obtaining one or more guide channels. For each of a plurality of local neighbourhoods, the method comprises: calculating the parameters of a model that approximates the noisy image as a function of the one or more guide channels, and applying the calculated parameters to produce a denoised image. Tiling is used when calculating the parameters of the model.

According to one aspect, there is provided a method of rendering an image of a 3-D scene, the method comprising:
rendering a noisy image;
obtaining one or more guide channels; and
for each of a plurality of local neighbourhoods:
  calculating the parameters of a model that approximates the noisy image as a function of the one or more guide channels, and
  applying the calculated parameters to produce a denoised image,
wherein calculating the parameters of the model comprises:
defining a first tile, defining respective first contiguous portions of the noisy image and the one or more guide channels, each comprising a first plurality of pixels;
defining a second tile, defining respective second contiguous portions of the noisy image and the one or more guide channels, each comprising a second plurality of pixels;
calculating a first outer product between each pixel in the one or more guide channels and itself; and
calculating a second outer product between each pixel in the one or more guide channels and the corresponding pixel in the noisy image,
wherein the first outer product and second outer product are calculated for pixels in the first tile either (i) before the second tile or (ii) concurrently with the second tile.

According to some examples, this approach can provide a combined rendering and denoising pipeline, suitable for efficient rendering of images that are at least partially produced using path-tracing. The approach of approximating a noisy image by means of such a function of one or more guide channels corresponds to denoising by guided filtering. The function may comprise or consist of a linear combination of the guide channels and a scalar offset. Thus, the model may comprise, or may be, an affine model.

In some examples, the scalar offset may be incorporated in the model by including a guide channel having a uniform value at every pixel—for example, an array of ones. Optionally, this guide channel is not stored in memory—it may be instantiated in software or hardware on the fly during fitting of the model (for example, by the model fitting unit).

The guide channels may contain information about scene structure in the 3-D scene, including but not limited to object boundaries, occlusion boundaries, and shadow edges. The guide channels may be essentially noise-free. They may be rendered by deterministic calculations (for example by rasterization), whereas the noisy image may be rendered by random sampling.

Where there are multiple guide channels, those channels can be considered to form a guide image, and the first outer product can be calculated between each pixel in the guide image and itself, whilst the second outer product can be calculated between each pixel in the guide image and the corresponding pixel in the noisy low-resolution image. Calculating the outer products for the first tile before the second tile means that the calculation for the first tile is completed before beginning calculating the outer products for the second tile. In this way, the tiles may be processed separately and consecutively—for example, by a single processor or single core in hardware. Calculating them concurrently means calculating them separately at the same time. This allows parallel processing—in particular, on different processors or cores in hardware. The first and second tiles may be non-overlapping.

Organising the processing in this way can allow for greater data locality. This can help with memory bandwidth efficiency—data within a tile may be cached locally to the processor or core performing the calculations, meaning that fewer accesses to external memory may be required.

The tiles may be rectangular. Each tile is smaller than the size of the noisy image and/or guide channel in at least one dimension. In some examples, each tile may comprise a horizontal strip, having the full width of the noisy image/guide channels, but a smaller height. In other examples, each tile may comprise a vertical strip, having the full height of the noisy image/guide channels, but a smaller width. When tiles are formed by strips, the tiles may be arranged in a one dimensional array. In still other examples, each tile may have a smaller width and a smaller height than the noisy image/guide channels. Such tiles may be arranged in a two-dimensional array.

The calculated parameters may be applied to the one or more guide channels (that is, the same guide channels that were used to calculate the parameters). Alternatively, in some examples, the calculated parameters may be applied to a second set of one or more guide channels, corresponding to those that were used to calculate the parameters. For example, the second set of guide channels may be corresponding guide channels at a different resolution—for instance, they may be upsampled or downsampled versions of the guide channels used in the parameter calculation.

In particular, the noisy image may be a low-resolution image, and the method may comprise calculating the parameters of the model that approximates the noisy image as a function of one or more low-resolution guide channels. The method may then comprise applying the calculated parameters to one or more full-resolution guide channels to produce the denoised image. The full-resolution guide channels correspond to the low-resolution guide channels in that they contain substantially the same content.

The relative resolutions of the "low-resolution" and "full-resolution" images can be selected according to the needs of the application. In general, the "full-resolution" images have a resolution that is greater than or equal to the resolution of the "low-resolution" images (and therefore the "full-resolution" images have a larger number of pixels than, or the same number of pixels as, the "low-resolution" images). Nevertheless, in most examples, the "full-resolution" images have a higher resolution than the "low-resolution" images.

The method can enable a denoised full-resolution image to be produced from a low-resolution noisy image. This can be more computationally efficient and/or more efficient in terms of memory access bandwidth than performing a denoising operation on a full-resolution noisy image. When denoising based on a low-resolution image, there can be a reduction in the amount of data that must be retrieved from memory and processed. This is because a local neighbourhood of the low-resolution guide channels and the low-resolution noisy image will generally be smaller (that is, will contain fewer pixels) than the corresponding neighbourhood at full-resolution.

Each local neighbourhood may be a local neighbourhood centred on a respective pixel of the noisy low-resolution image, whereby a different set of model parameters is calculated for each pixel.

Applying the calculated parameters to the one or more full-resolution guide channels may comprise applying parameters that were calculated for a local neighbourhood of the low-resolution guide channel(s) to a corresponding local neighbourhood of the full-resolution guide channel(s). Applying the calculated parameters to the one or more full-resolution guide channels may comprise upsampling the calculated parameters, and applying the upsampled calculated parameters to the one or more full-resolution guide channels.

Rendering the noisy image may comprise rendering by path tracing. In this case, the method can be seen as denoising a path-traced image by means of guided filtering. Path-tracing is computationally intensive, because of the need to cast multiple rays per pixel, potentially with multiple "bounces" per ray. When the noisy image is a low-resolution image, examples of the present method can avoid the need to render a full-resolution path-traced image. The inventors have found that comparable results can be achieved more efficiently by using low-resolution images and investing computational effort in the number of rays per pixel and/or number of bounces per ray, rather than rendering a larger number of pixels. In other words, the computational effort is better invested in producing a less noisy low-resolution image and/or a closer approximation to the light transport, rather than producing a noisier or more approximate full-resolution image.

The noisy image optionally (i) comprises indirect lighting in the scene or (ii) comprises an ambient occlusion image. Optionally, the noisy image consists solely of indirect lighting. Here, "direct" lighting refers to rays that interact (intersect) with a single object before arriving at the virtual camera/observer. This means that the light ray travels directly from a light source to the object (or, equivalently, is traced from the object to the light source) and then travels directly from the object to the virtual camera. The object is therefore lit "directly" by the light source. In contrast, "indirect" lighting refers to light rays that have interacted (intersected) with at least two objects between the light source and the virtual camera. For example, a light ray may be reflected by a first object toward a second object, and may be reflected by the second object toward the virtual camera. A direct lighting image does not incorporate any information about the surface reflectance of the objects in the scene. An indirect lighting image does not incorporate any information about the surface reflectance of the object "nearest" the virtual camera—meaning the final surface that a light ray interacts with on its path from the light source to the camera. However, in general, an indirect lighting image does incorporate information about the colour of the surfaces "closer" to the light source, since the interaction of the light ray with these coloured surfaces will influence the colour of the indirect illumination falling on the "nearest" object. The direct lighting and indirect lighting may be combined before or after the denoising. A direct lighting image may be modelled using ray tracing, for example. It will typically be low noise or noise free. Indirect lighting will typically be noisier than direct lighting.

In some examples, the noisy image may comprise a ray-traced ambient occlusion image. This can provide an approximation to indirect lighting (ignoring the positions and intensities of light sources).

The denoised image may be a denoised indirect lighting image or a denoised ambient occlusion image, and the method may further comprise: obtaining a direct lighting image; and combining the denoised image with the direct lighting image to produce a global illumination image.

The combining may comprise summing the denoised image and the direct lighting image. In this example, the direct lighting image is combined with the indirect lighting image (or ambient occlusion image) after denoising. It should be understood that if the noisy image comprises an ambient occlusion image, then the global illumination image will contain an approximation to global illumination.

Obtaining the direct lighting image may comprise rendering it by ray-tracing or rendering it by rasterization. In said ray-tracing, each ray may be cast along a path with exactly one bounce. Rendering the direct lighting image by rasterization may comprise rendering with shadow mapping.

The noisy image may be a noisy global illumination image, comprising direct and indirect lighting in the scene, whereby the denoised image is a denoised global illumination image. Rendering the noisy global illumination image may comprise combining (for example, summing) a noisy indirect lighting image and a direct lighting image. In this example, the direct lighting image is combined with the indirect lighting image before denoising. Alternatively, a noisy global illumination image may be rendered directly by path tracing simulating direct and indirect lighting.

The method may further comprise combining the global illumination image or the denoised global illumination image with a surface reflectance image to produce a rendered image of the 3-D scene. The combining may comprise multiplying the global illumination by the surface reflectance. The surface reflectance image may comprise or consist of albedo, including diffuse albedo or specular albedo. The surface reflectance image may be rendered by rasterization.

The guide channels may be rendered by ray-casting or rasterization (in any combination). Obtaining the one or more guide channels may comprise rendering by rasterization.

For example, low-resolution guide channel(s) may be rendered by rasterization, and high-resolution guide channel(s) may be rendered by ray-casting or rasterization. Alternatively, high-resolution guide channel(s) may be rendered by rasterization and low-resolution guide channel(s) may be rendered by ray-casting or rasterization.

The low-resolution guide channels may be obtained by rendering at low resolution by a first rasterization pass; and the full-resolution guide channels may be obtained by rendering at full resolution by a second rasterization pass.

That is, the low-resolution and full-resolution guide channels may be rendered separately. Alternatively, the low-resolution guide channels may be generated from the full-resolution guide channels by down-sampling. However, the inventors have found that it may be more efficient to render guide channels twice, at different resolutions, rather than render them once at full resolution and down-sample them. This is because memory access bandwidth can be reduced by rendering the guide channels twice. Rather than writing/reading the guide channels to/from memory, they can be rendered at the desired resolution as needed by the algorithm.

A single rasterization pass may have several outputs. Therefore, multiple guide channels (and optionally all of the guide channels) may be generated by a single rasterization pass.

The guide channels may comprise any one or any combination of two or more of: depth information of objects in the 3-D scene; information identifying materials of objects in the 3-D scene; surface reflectances of objects in the 3-D scene; shadows in the 3-D scene; and surface normals of objects in the 3-D scene.

At least one of the noisy image, the one or more guide channels, and the denoised image, may be stored in a quantized low-bitdepth format.

Quantizing can reduce the volume of data to be stored and thereby can reduce memory bandwidth requirements. Quantization converts data from a high-bitdepth format (for example, 32-bit floating point) to a low-bitdepth format (for example, 8-bit integer).

The method may further comprise, after rendering the noisy image, quantizing it in a quantized low-bitdepth format with nonlinear quantization, such that darker regions of the image are quantized to a relatively greater density of quantization levels, and lighter regions of the image are quantized to a relatively lesser density of quantization levels, and storing the quantized low-bitdepth format in a memory, wherein the method further comprises, before calculating the parameters of the model, retrieving the quantized low-bitdepth value from the memory and performing inverse quantization.

Here, the quantization step size is smaller in dark regions of the image than in light regions of the image. This allows dark (for example, dimly lit) regions of the scene to be represented accurately. In one example of non-linear quantization, the quantizing comprises applying a square root function, followed by uniform quantization of the output of the square root function.

Calculating the parameters of the model may comprise: calculating a first outer product between each pixel in the one or more guide channels and itself; calculating a second outer product between each pixel in the one or more guide channels and the corresponding pixel in the noisy image; blurring the first outer products to calculate a first moment matrix for each local neighbourhood; blurring the second outer products to calculate a second moment matrix for each local neighbourhood; and calculating the parameters of the model for each local neighbourhood, comprising calculating an inverse matrix of the first moment matrix, and calculating a product of the inverse matrix and the second moment matrix.

Here, it should be understood that each pixel is represented by a row vector. Each pixel in the one or more guide channels is represented as a row vector x; each pixel in the noisy image is represented by a row vector y.

"Blurring" refers to spatial averaging—for example, summing over the local neighbourhood, optionally using a weighted summation, optionally wherein a centre of the local neighbourhood is given greater weight in the summation than a periphery of the local neighbourhood.

Optionally, calculating the parameters of the model comprises, before calculating the inverse matrix, adding a regularization matrix to the first moment matrix. The regularization matrix may comprise a diagonal matrix. The regularization matrix can help to avoid numerical instability in the matrix inverse.

Blurring the first outer products optionally comprises calculating a first multiscale pyramid from the first outer products and calculating the first moment matrix based on the first multiscale pyramid; and/or blurring the second outer products optionally comprises calculating a second multiscale pyramid from the second outer products and calculating the second moment matrix based on the second multiscale pyramid.

The multiscale pyramid has a plurality of levels, wherein successive levels describe the outer products at successive different levels of detail. The multiscale pyramid may comprise or consist of a mipmap pyramid, for example. Mipmaps are amenable to efficient implementation, for example in fixed-function hardware of a graphics processing unit (GPU).

The blurred outer products (that is, the moment matrices) may be calculated directly from a predetermined level of the pyramid. In this case, the calculation of the pyramid may stop at this level. In other examples, the moment matrices may be calculated by interpolation using the pyramid. The interpolation may comprise bilinear or trilinear interpolation, or other sampling—for example bicubic sampling.

The blurring may comprise separable filtering in horizontal and vertical directions.

The filtering may use a centre-weighted filter function such as a Gaussian function. Optionally, the separable filtering may be applied to a predetermined level of the multiscale pyramid. This can facilitate an efficient implementation of centre-weighted filtering with reduced computational complexity (compared with filtering the outer products directly using the centre-weighted filter).

This type of blurring may be applied to one or both of the first and second outer products.

The blurring may comprise filtering using an anisotropic 2-D filter. By anisotropic, it is meant that the filter has a major axis and a minor axis perpendicular to the major axis, and extends further along the major axis than the minor axis. The axes may be aligned with the horizontal and vertical directions, or the axes may be independent of the horizontal and vertical directions.

The one or more guide channels may include surface normals of objects in the 3-D scene, and the blurring may comprise: for each local neighbourhood, determining a major axis and minor axis of a 2-D filter, based on the surface normal of the object at the centre of the neighbourhood; selecting a level of the multiscale pyramid, based on the length of the minor axis; and sampling the selected level of the multiscale pyramid along the major axis.

This can offer a computationally efficient way to adapt the blurring to the scene content—in particular, by adapting the blurring dependent on the orientation of the surface being sampled.

In some examples, the blurring comprises IIR filtering.

In some examples, the blurring comprises filtering with a running box filter.

The method may comprise: defining a first outer product tile, defining a first contiguous portion of the first outer product and a respective first contiguous portion of the second outer product, each comprising a first plurality of pixels; and defining a second outer product tile, defining a second contiguous portion of the first outer product and a respective second contiguous portions of the second outer product, each comprising a second plurality of pixels, wherein the first moment matrix and second moment matrix are optionally calculated for the first tile either (i) before the second tile or (ii) concurrently with the second tile.

The first and second outer product tiles may be overlapping tiles. This is because, in general, the blurring of the outer products will not be separable into non-overlapping tiles. The extent of the overlap may be dependent on a size of a filter used for the blurring.

The method may further comprise normalizing and/or regularizing one or both of the first moment matrix and the second moment matrix. This can improve the stability of the matrix inverse. Normalizing can complement the use of the regularization matrix in this regard. Normalizing may comprise utilising the mean and standard deviation information in the moment matrix to normalize the moments before the inverse calculation. This can improve the numerical stability of the matrix inverse and thus improve visual quality. In some examples, one or both matrices may be normalized to have zero mean and a constant standard deviation (such as a standard deviation equal to one).

Also provided is a method of rendering an image of a 3-D scene, the method comprising:

rendering a noisy image;
obtaining one or more guide channels; and
for each of a plurality of local neighbourhoods:
    calculating the parameters of a model that approximates the noisy image as a function of the one or more guide channels, and
    applying the calculated parameters to produce a denoised image,
wherein calculating the parameters of the model comprises:
calculating a first outer product between each pixel in the one or more guide channels and itself;
calculating a second outer product between each pixel in the one or more guide channels and the corresponding pixel in the noisy image;
blurring the first outer products to calculate a first moment matrix for each local neighbourhood;
blurring the second outer products to calculate a second moment matrix for each local neighbourhood; and
calculating the parameters of the model for each local neighbourhood, comprising calculating an inverse matrix of the first moment matrix, and calculating a product of the inverse matrix and the second moment matrix,
the method comprising, when blurring the first and second outer products:
defining a first outer product tile, defining a first contiguous portion of the first outer product and a respective first contiguous portion of the second outer product, each comprising a first plurality of pixels; and
defining a second outer product tile, defining a second contiguous portion of the first outer product and a respective second contiguous portions of the second outer product, each comprising a second plurality of pixels,
wherein the first moment matrix and second moment matrix are calculated for the first tile either (i) before the second tile or (ii) concurrently with the second tile.

This method offers another advantageous way to use tiling in the rendering and denoising pipeline. As noted already above, the first and second outer product tiles may be overlapping tiles. This is because, in general, the blurring of the outer products will not be separable into non-overlapping tiles. The extent of the overlap may be dependent on a size of a filter used for the blurring.

The outer product tiles may be rectangular. Each outer product tile is smaller than the size of the respective outer products in at least one dimension. In some examples, each outer product tile may comprise a horizontal strip, having the full width of the outer products, but a smaller height. In other examples, each outer product tile may comprise a vertical strip, having the full height of the outer products, but a smaller width. When outer product tiles are formed by strips, they may be arranged in a one-dimensional array such that an outer product tile overlaps along one edge with the preceding outer product tile and along the opposite edge with the succeeding outer product tile. In still other examples, each outer product tile may have a smaller width and a smaller height than the outer products. Such outer product tiles may be arranged in a two-dimensional array. In this case, an outer product tile may overlap with adjacent outer product tiles above, below, to the left and to the right of it.

Also provided is a graphics processing unit configured to render an image of a 3-D scene, the graphics processing unit comprising:

a first rendering block, configured to render a noisy image;
a second rendering block, configured to render one or more guide channels;
a model fitting block, configured to, for each of a plurality of local neighbourhoods, calculate the parameters of a model that approximates the noisy image as a function of the one or more guide channels; and
a model application block, configured to, for each of the plurality of local neighbourhoods, apply the calculated parameters to produce a denoised image
wherein the model fitting block is configured to, when calculating the parameters:
define a first tile, defining respective first contiguous portions of the noisy image and the one or more guide channels, each comprising a first plurality of pixels;
define a second tile, defining respective second contiguous portions of the noisy image and the one or more guide channels, each comprising a second plurality of pixels;
calculate a first outer product between each pixel in the one or more guide channels and itself; and
calculate a second outer product between each pixel in the one or more guide channels and the corresponding pixel in the noisy image,
wherein the first outer product and second outer product are calculated for pixels in the first tile either (i) before the second tile or (ii) concurrently with the second tile.

The model application block may be configured to apply the calculated parameters to the one or more guide channels (that is, the same guide channels that were used to calculate the parameters). Alternatively, in some examples, the model application block may be configured to apply the calculated parameters to a second set of one or more guide channels, corresponding to those that were used to calculate the parameters.

The noisy image, and/or the one or more guide channels, may be stored in a memory in the quantized low-bitdepth format.

The first rendering block may be configured to render the noisy image by path tracing.

The second rendering block may be configured to render the one or more guide channels by rasterization or ray-tracing.

The noisy image may comprise indirect lighting in the scene or may comprise an ambient occlusion image, wherein the denoised image comprises an indirect lighting image or a denoised ambient occlusion image, and the graphics processing unit may further comprise: a fourth rendering block, configured to render a direct lighting image; and a combination block, configured to combine the denoised image with the direct lighting image to produce a global illumination image.

The fourth rendering block may be configured to render the direct lighting image by ray-tracing.

The noisy image may be a noisy global illumination image, comprising direct and indirect lighting in the scene, whereby the denoised image is a denoised global illumination image.

The second rendering block may be configured to render a surface reflectance image, and the graphics processing unit may further comprise a product block, configured to calculate the product of the global illumination image or the denoised global illumination image and the surface reflectance image, to thereby produce a rendered image of the 3-D scene.

The surface reflectance image may be rendered by rasterization.

Also provided is a graphics processing unit configured to render an image of a 3-D scene, the graphics processing unit comprising:
a first rendering block, configured to render a noisy image;
a second rendering block, configured to render one or more guide channels;
a model fitting block, configured to, for each of a plurality of local neighbourhoods, calculate the parameters of a model that approximates the noisy image as a function of the one or more guide channels; and
a model application block, configured to, for each of the plurality of local neighbourhoods, apply the calculated parameters to produce a denoised image
wherein the model fitting block is configured to, when calculating the parameters:
calculate a first outer product between each pixel in the one or more guide channels and itself;
calculate a second outer product between each pixel in the one or more guide channels and the corresponding pixel in the noisy image;
blur the first outer products to calculate a first moment matrix for each local neighbourhood;
blur the second outer products to calculate a second moment matrix for each local neighbourhood; and
calculate the parameters of the model for each local neighbourhood, comprising calculating an inverse matrix of the first moment matrix, and calculating a product of the inverse matrix and the second moment matrix,
wherein the model fitting block is configured to, when blurring the first and second outer products:
define a first outer product tile, defining a first contiguous portion of the first outer product and a respective first contiguous portion of the second outer product, each comprising a first plurality of pixels; and
define a second outer product tile, defining a second contiguous portion of the first outer product and a respective second contiguous portions of the second outer product, each comprising a second plurality of pixels,
wherein the first moment matrix and second moment matrix are calculated for the first tile either (i) before the second tile or (ii) concurrently with the second tile.

Also disclosed is a method of rendering an image of a 3-D scene, the method comprising:
rendering a noisy low-resolution image;
obtaining one or more low-resolution guide channels and obtaining one or more corresponding full-resolution guide channels; and
for each of a plurality of local neighbourhoods:
calculating the parameters of a model that approximates the noisy low-resolution image as a function of the one or more low-resolution guide channels, and
applying the calculated parameters to the one or more full-resolution guide channels, to produce a full-resolution denoised image.

Also disclosed is a graphics processing unit configured to render an image of a 3-D scene, the graphics processing unit comprising:
a first rendering block, configured to render a noisy low-resolution image;
a second rendering block, configured to render one or more low-resolution guide channels;

a third rendering block, configured to render one or more full-resolution guide channels, each full-resolution guide channel corresponding to a respective low-resolution guide channel;

a model fitting block, configured to, for each of a plurality of local neighbourhoods, calculate the parameters of a model that approximates the noisy low-resolution image as a function of the one or more low-resolution guide channels; and a model application block, configured to, for each of the plurality of local neighbourhoods, apply the calculated parameters to the one or more full-resolution guide channels, to produce a full-resolution denoised image.

Also disclosed is a method of rendering an image of a 3-D scene, the method comprising:

rendering a noisy image;

obtaining one or more guide channels; and for each of a plurality of local neighbourhoods:

calculating the parameters of a model that approximates the noisy image as a function of the one or more guide channels, and applying the calculated parameters to produce a denoised image, wherein at least one of the noisy image, the one or more guide channels, and the denoised image are stored in a quantized low-bitdepth format.

Also disclosed is a graphics processing unit configured to render an image of a 3-D scene, the graphics processing unit comprising:

a first rendering block, configured to render a noisy image;

a second rendering block, configured to render one or more guide channels;

a model fitting block, configured to, for each of a plurality of local neighbourhoods, calculate the parameters of a model that approximates the noisy image as a function of the one or more guide channels; and a model application block, configured to, for each of the plurality of local neighbourhoods, apply the calculated parameters to produce a denoised image, wherein at least one of the noisy image, and the one or more guide channels, are stored in a quantized low-bitdepth format.

Also provided is a graphics processing system, configured to perform a method as summarised above, and/or comprising a graphics processing unit as summarised above. The graphics processing system may be embodied in hardware on an integrated circuit.

Also provided is a method of manufacturing, using an integrated circuit manufacturing system, a graphics processing system as summarised above.

Also provided is a method of manufacturing, using an integrated circuit manufacturing system, a graphics processing system as summarised above, the method comprising: processing, using a layout processing system, a computer readable description of the graphics processing system so as to generate a circuit layout description of an integrated circuit embodying the graphics processing system; and manufacturing, using an integrated circuit generation system, the graphics processing system according to the circuit layout description.

Further provided is computer readable code configured to cause a method as summarised above to be performed when the code is run, and optionally a computer readable storage medium having encoded thereon the computer readable code.

Also provided is an integrated circuit definition dataset that, when processed in an integrated circuit manufacturing system, configures the integrated circuit manufacturing system to manufacture a graphics processing system as summarised above.

Still further provided is a computer readable storage medium (optionally non-transitory) having stored thereon a computer readable description of a graphics processing system as summarised above that, when processed in an integrated circuit manufacturing system, causes the integrated circuit manufacturing system to manufacture an integrated circuit embodying the graphics processing system.

Also provided is a computer readable storage medium (optionally non-transitory) having stored thereon a computer readable description of a graphics processing system as summarised above which, when processed in an integrated circuit manufacturing system, causes the integrated circuit manufacturing system to: process, using a layout processing system, the computer readable description of the graphics processing system so as to generate a circuit layout description of an integrated circuit embodying the graphics processing system; and manufacture, using an integrated circuit generation system, the graphics processing system according to the circuit layout description.

Also provided is an integrated circuit manufacturing system configured to manufacture a graphics processing system as summarised above.

Also provided is an integrated circuit manufacturing system comprising: a computer readable storage medium (optionally non-transitory) having stored thereon a computer readable description of a graphics processing system as summarised above; a layout processing system configured to process the computer readable description so as to generate a circuit layout description of an integrated circuit embodying the graphics processing system; and an integrated circuit generation system configured to manufacture the graphics processing system according to the circuit layout description.

The layout processing system may be configured to determine positional information for logical components of a circuit derived from the integrated circuit description so as to generate a circuit layout description of an integrated circuit embodying the graphics processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
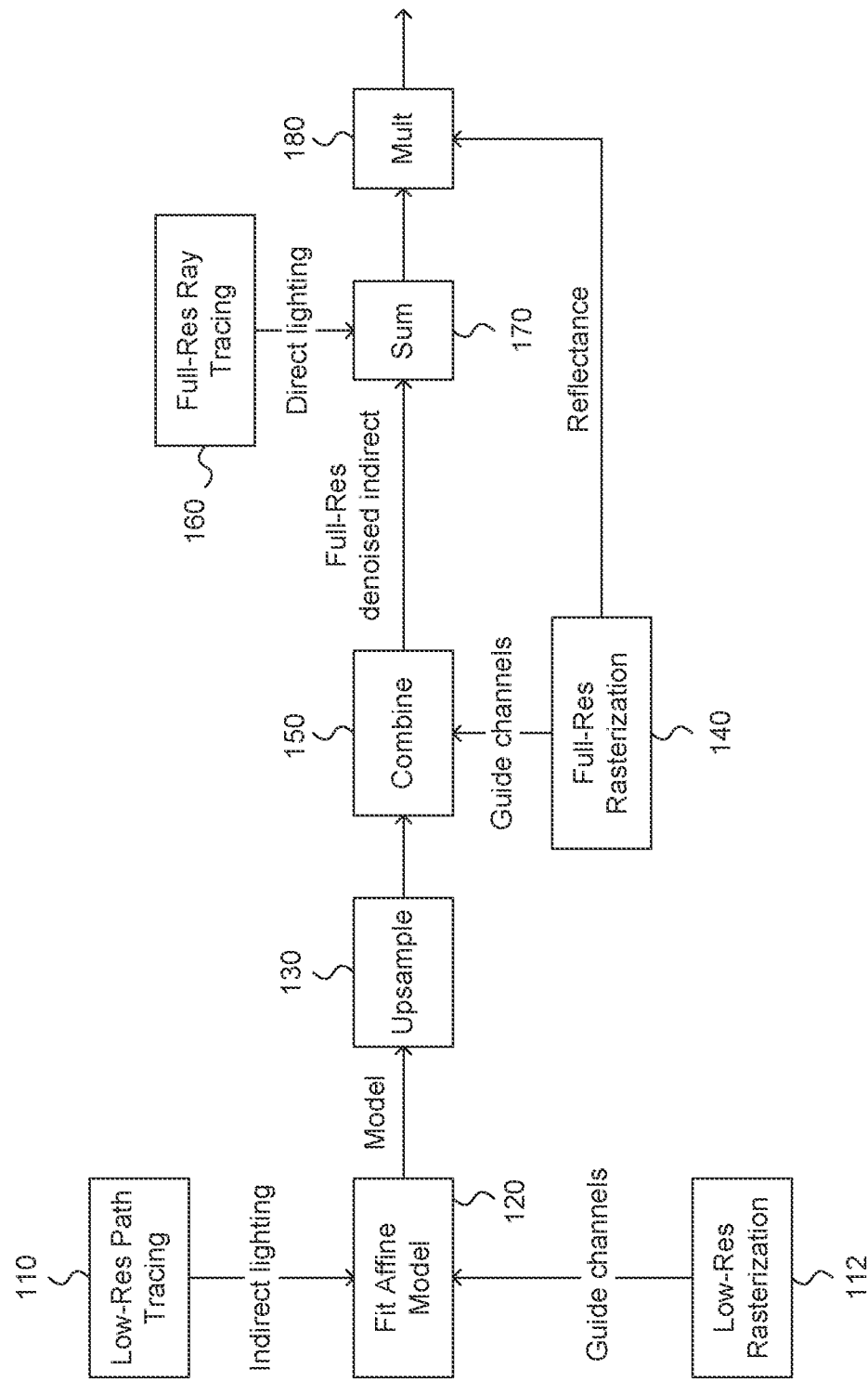
FIG. 1 shows a flowchart illustrating a rendering method according to an example.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Various techniques for rendering are known in the field of computer graphics. "Rendering", also known as image synthesis, refers to the process of generating an image of a virtual 3-D scene, as it would be viewed by a virtual camera at a particular position and orientation. The geometry of objects in the scene is modelled in three dimensions; and the rendering process approximates/simulates how light rays would arrive at the virtual camera from the interaction of light sources with the modelled geometry.

Path-tracing, ray-tracing, and rasterization are three rendering techniques. The terms "ray-tracing" and "path-tracing" are sometimes used interchangeably in the literature. For greater clarity, we will first define what we mean by these terms, in the present context.

As used herein, the term "path-tracing" refers to a stochastic sampling method, which simulates the transport of light in a 3-D scene. In some examples according to the present disclosure, path-tracing is capable of approximating global illumination by modelling interactions of all types between rays of light and objects in the scene, potentially including higher-order reflections (second and third bounces, etc). However, because of its stochastic nature, path-tracing is inherently noisy. Note that path-tracing is not limited to approximating global illumination. "Ray-traced ambient occlusion" is a kind of path-tracing, which calculates how exposed each point in the 3-D scene is to ambient lighting (rather than calculating global illumination as such). Ray traced ambient occlusion can be considered as a coarse approximation to indirect lighting.

As used herein, the term "ray-tracing" refers to a deterministic, noise-free method of simulating the transport of light in a 3-D scene, by modelling certain kinds of interaction between light rays and objects. Ray tracing typically only determines direct light, reflection, refraction, and the like, and does not depend on complex light paths interacting with multiple objects.

The term "ray-casting" refers to a specific kind of ray-tracing, in which a ray is cast along a single direct path, with no reflections or refractions.

Rendering by path-tracing and ray-tracing is distinct from rendering by "rasterization". In rasterization, 3-D scene geometry is mapped to pixels in 2-D screen space without taking into account the physical transport of light in the 3-D scene.

Rendering Pipeline

Figure 2:
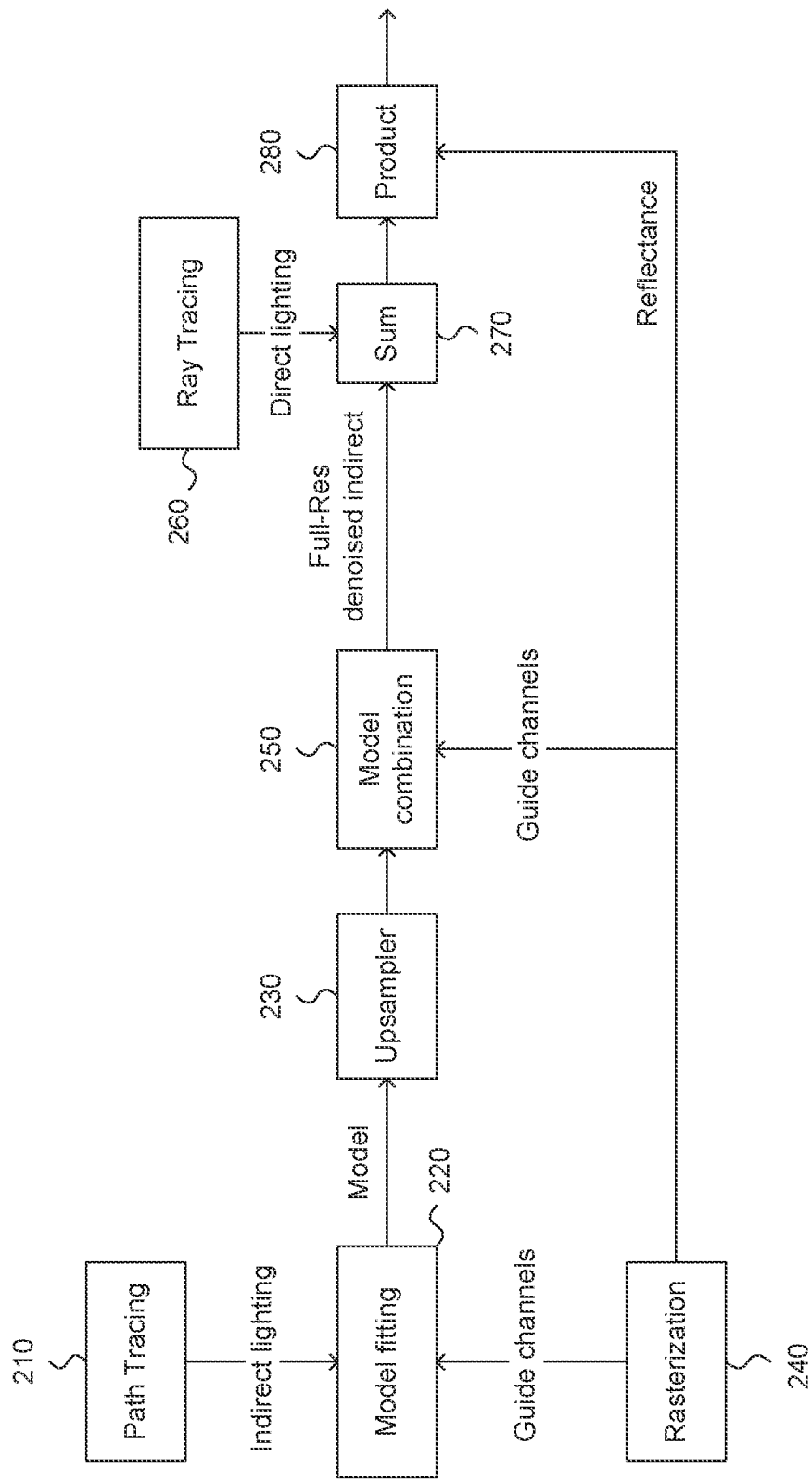
FIG. 2 is a block diagram of a graphics processing unit for rendering, according to an example.

A first example of rendering an image will now be described with reference to FIGS. 1 and 2. FIG. 1 is a flowchart illustrating a method of rendering an image of a 3-D scene according to an example. FIG. 2 is a block diagram showing functional blocks of a graphics processing unit configured to carry out the method of FIG. 1. The graphics processing unit (GPU) comprises first, second, third, and fourth rendering blocks. In this example, the first rendering block is a path-tracing block 210. The second and third rendering blocks are both provided by a rasterization block 240. The fourth rendering block is a ray-tracing block 260. The GPU also comprises a model fitting block 220, an upsampler 230, a model combination block 250, a summation block 270 and a product block 280. The up-sampling 230 and the model combination block 250 together make up a model application block, responsible for applying the model. The summation block 270 operates as a combination block, combining a denoised image, produced by the application of the model, with an image produced by the fourth rendering block 260.

In step 110, the path tracing block 210 produces a low resolution indirect lighting image by path tracing. In step 112, the rasterization block 240 produces low resolution guide channels in a first rasterization pass. The indirect lighting image and the guide channels correspond to one another, in that they are all rendered for the same viewpoint in the 3-D scene. They are also rendered at the same (low) resolution. The indirect lighting image is noisy, because of the stochastic nature of path tracing. The guide channels are noise free, because rasterization is deterministic. In the present example, the set of low resolution guide channels includes a depth image, a surface reflectance image, and a surface normal image. However, the set of low resolution guide channels need not include all these images (for example, the surface reflectance image might not be included). Optionally, other guide channels may be included, such as images identifying the materials of objects in the scene and/or images showing shadows in the scene.

The low resolution images are typically a fraction of the size of the desired full resolution images. For example, they may be smaller by a factor of two in each dimension (that is, both in height and in width), such that they are a quarter of the area and resolution of the full resolution images. In some examples, they may be a smaller fraction still of the full resolution images. For instance, the low resolution images may be smaller by a factor of four in each dimension, such that they are one sixteenth of the area and resolution of the full resolution images.

The rendering method will produce a full resolution rendered image, based in part on the guide image (comprising a plurality of guide channels) and the noisy indirect lighting image. The low resolution images (that is, the guide image and the indirect lighting image) are passed to the model fitting block 220. In step 120, the model fitting block 220 fits the parameters of an affine model for each pixel of the low resolution images, such that it can be used to map the low resolution guide image onto the low resolution indirect lighting image. For each pixel, the parameter estimation examines a local neighbourhood centred on the pixel and approximates the noisy indirect lighting image as a linear combination of the guide channels and a scalar offset, within this local neighbourhood. This produces a set of model parameters for each of the local neighbourhoods (that is, for each of the pixels).

In step 130, the upsampler 230 up-samples the model parameters to full resolution. In step 140, the rasterization block 240 renders a set of full resolution guide channels in a second rasterization pass. The full resolution guide channels correspond one-to-one with the low resolution guide channels. Indeed, in some examples, the low resolution guide channels could be generated by subsampling the full resolution guide channels. However, the present inventors have found that savings in memory access bandwidth are possible by rendering the low resolution guide channels and full resolution guide channels separately, in two rasterization passes. This can avoid the need to store the full resolution multi-channel guide image and later retrieve it from memory for downsampling. Memory bandwidth can be a limiting factor in some hardware architectures and applications; therefore, reducing memory bandwidth is highly desirable. Another advantage of using low resolution guide channels is a reduction in the number of operations needed to produce the (low resolution) moment images, since fewer matrices will need to be summed when producing the moment images.

The full resolution guide channels are provided to the model combination block 250. As noted above, the guide channels in the present example include a surface reflectance image. The full resolution surface reflectance image is additionally provided to the product block 280. In other examples in which the surface reflectance image is not used as a guide channel, the surface reflectance image is still produced (i.e. as well as the guide channels) so that it can be provided to the product block 280.

In step 150, the model combination block combines the upsampled model parameters from the upsampler 230 with the full resolution guide channels produced by the rasterization block 240. This involves generating each pixel as a linear combination of the full-resolution guide channels, wherein the linear combination is determined by the model parameters for that pixel. In the present example, since the image to be denoised was a noisy indirect lighting image, the output of the model combination block 250 is a full resolution denoised indirect lighting image.

In step 160, the ray-tracing block 260 renders a direct lighting image by ray tracing. As explained already above, ray tracing is deterministic. As such, it is inherently noise free and less computationally intensive than the rendering 110 of the indirect lighting image by path tracing. As a result of this lower complexity, the rendering of the direct lighting image at full resolution does not impose a large computational burden.

In step 170, the summation block 270 combines the denoised indirect lighting image provided by the model combination block 250 with the direct lighting image provided by the ray tracing block 260, by summing them. The result of the summation is a global illumination image, at full resolution. In step 180, the product block 280 multiplies (pixel by pixel) the full resolution surface reflectance image by the full resolution global illumination image. This produces the final rendered image of the scene under global illumination conditions.

The affine model created in step 120 is based on the guided filter method of He et al. (Kaiming He, Jian Sun, and Xiaoou Tang, "Guided Image Filtering"; in: Daniilidis K., Maragos P., Paragios N. (eds) Computer Vision— ECCV 2010. Lecture Notes in Computer Science, vol 6311, Springer. https://doi.org/10.1007/978-3-642-15549-9_1). For each local neighbourhood Y of a noisy input image, this method attempts to find the affine transform A that best maps a local neighbourhood X of a guide image to the corresponding local neighbourhood Y of the noisy input image. These local neighbourhoods may be represented as matrices, and the "best" transformation defined as a least squares optimal fit. That is, the solution A is to be found to minimise the matrix equation $E=\|XA-Y\|_2^2$, where $X \in \mathbb{R}^{N \times G}$, $A \in \mathbb{R}^{G \times M}$ and $Y \in \mathbb{R}^{N \times M}$, and N is the number of pixels in the local neighbourhood, G is the number of guide channels (including the offset term), and M is the number of output channels. It should be understood that the labels for the dimensions are essentially arbitrary.

There may be multiple guide channels in the guide image, as in the present example. In this case, the model A is an affine transform with multiple input signals. According to the present formulation (and differing from the formulation of He et al.) the offset term is included directly in the matrix multiplication, by adding an additional guide channel that consists of an array of ones with corresponding values in the A matrix. This additional guide channel of ones is constant, so may be implicit in block 220 so that bandwidth is not wasted transmitting it. The matrix X representing the guide image channels is thus composed as follows $$X = \begin{pmatrix} 1 & X_{0,0} & X_{0,1} & X_{0,2} \\ 1 & X_{1,0} & X_{1,1} & X_{1,2} \\ \cdots & \cdots & \cdots & \cdots \\ 1 & X_{N-1,0} & X_{N-1,1} & X_{N-1,2} \end{pmatrix}.$$

Here, each row represents a pixel in the local neighbourhood centred on the pixel of interest. Each column represents one channel of the overall multi-channel guide image. The least squares optimisation problem is modified to include regularization, which gives a smoother result and reduces susceptibility to numerical instability:

$$E=\|XA-Y\|_2^2+N\|U^{1/2}A\|_2^2.$$

Here, N is a scalar, introduced for consistency with the formulation of He et al. U is a diagonal matrix constructed so that the entry corresponding to the channel of ones in X is zero:

$$U=\mathrm{diag}(0,\epsilon_0,\epsilon_1,\ldots).$$

The numbers $\epsilon$ are positive. Suitable exemplary values are of the order of 0.0001. Minimising E with respect to A has the closed form solution:

$$A=(X^TX+NU)^{-1}X^TY.$$

Figure 3:
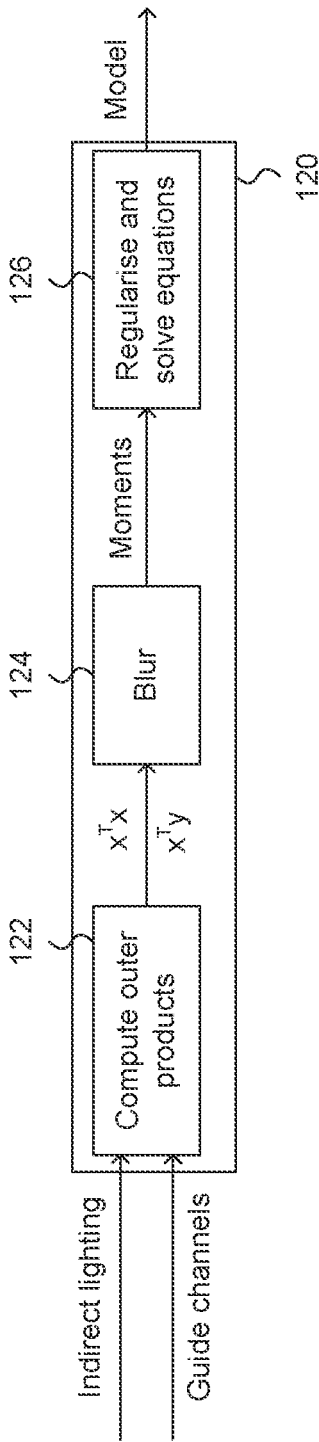
FIG. 3 illustrates the model-fitting step of FIG. 1 in greater detail.

A denoised pixel is given by the vector-matrix product xA, where x is the structure vector of the pixel (a row of the X matrix), and A is the model constructed from the neighbourhood of the target pixel. The denoised output is given by multiplying the guide image and the corresponding local model parameters A at each pixel. The computation of the model parameters A can be broken down into stages, as illustrated in FIG. 3. The first stage involves calculating the terms $X^TX$ and $X^TY$, which are sometimes referred to as "moment matrices" or simply "moments". This in turn can be broken down into two stages. Firstly, per-pixel outer product calculations are performed. Secondly, the outer products are summed over the local neighbourhood ("blurred") to produce the moment matrices. Although not indicated by the equations above (which explain how to calculate a matrix A for a given local neighbourhood), it can be shown that spatially blurring the outer product terms after they have been calculated is equivalent to explicitly constructing the X and Y matrices and performing the matrix multiplications necessary to produce the moment matrices. The calculation of the outer products by the model fitting block 220 is indicated by step 122 in FIG. 3. We will refer to the output of step 122 as first outer products $x^T x$ and second outer products $x^T y$. In step 124, the model fitting block 220 blurs the outer products, to produce the moment matrices. We will refer to the outputs of the blurring step as the first moment matrix $X^T X$ and second moment matrix $X^T Y$. The blurring can be performed in a variety of different ways and will be described in further detail below.

After blurring the moments in step 124, the model fitting block 220 adds the regularization and solves the least squares problem. This involves inverting the regularized first moment matrix, followed by multiplying the result of the matrix inversion by the second moment matrix, as indicated in the equation above. The output of step 126 is a model matrix for each pixel of the low resolution image. In the method of He et al, the model parameters are further blurred spatially. However, the present inventors have found that this is unnecessary and in fact can lead to lower image quality in many cases. Therefore, the method proceeds without blurring the model parameters.

As explained already above, the model parameters are upsampled in step 130 by the upsampler 230. This converts them to full resolution. They are then combined (in step 150) with the full resolution guide image produced by the rasterization unit. This operation implements the formula Y=XA, as discussed previously.

Tiling

Figure 4:
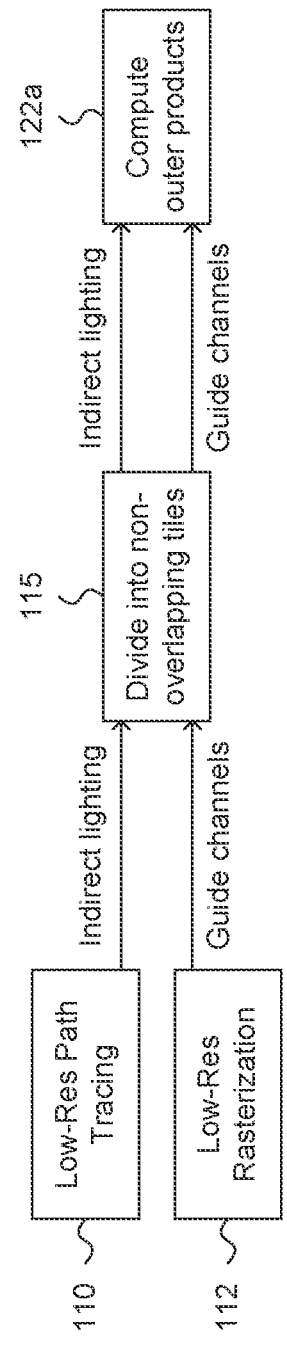
FIG. 4 illustrates a variant of part of the method shown in FIG. 1, which uses tile-based processing.
Figure 5:
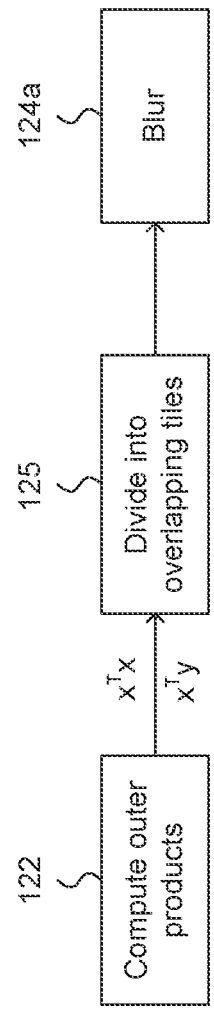
FIG. 5 illustrates another variant of part of the method shown in FIG. 1, using tile-based processing.

Some optional additional steps that can be introduced into the model fitting 120 are illustrated in FIGS. 4 and 5. The calculations involved in the model fitting are somewhat computationally intensive and data intensive. The inventors have recognised that it may be advantageous to perform the model fitting in a tile-based manner. This approach involves breaking the data down into tiles (which may in general be overlapping or non-overlapping) and processing each tile separately. This has several potential advantages. Firstly, the size of a tile may be selected so that all the data needed to perform a calculation for one tile can be stored in on-chip memory in the GPU. This can avoid the need to read and write data from and to an external memory, which will typically be a slower operation than accessing on-chip memory. Secondly, the ability to divide the processing into tiles facilitates parallel implementation, when multiple processors or cores are available in the GPU. Note however that tiling is useful independently of parallelisation, because of the first advantage. Even if tiles are processed consecutively, by a single core or single processor, the effect of greater data locality and reduced memory access bandwidth can still facilitate increased processing speed and/or reduced power consumption.

Tiling can be applied in at least two ways. As illustrated in FIG. 4, tiling can be employed in the calculation of the outer products. The GPU divides the low resolution noisy indirect lighting image and the guide image into tiles in step 115. Then, in step 122a, as a variation on step 122, the outer products are computed for each tile independently of the others. The tiles created in step 115 are non-overlapping, because the data needed for the outer product calculations is different from each tile to the next. This is because the calculation of outer products is inherently a per-pixel operation.

Alternatively, or in addition, tiling can be employed in the blurring, which computes the moment matrices from the outer products. This is illustrated in FIG. 5. The outer products generated in step 122 (or step 122a) are divided into overlapping tiles in step 125. Blurring is applied to each tile independently, in step 124a. Note that the tiles used for blurring necessarily overlap to some extent, because of the spatial extent of the local neighbourhoods that are used to create the model. These local neighbourhoods are reflected in the size of the filter kernel used for the blurring.

Blurring

The blurring (step 124 or step 124a) can be carried out in a variety of ways. The purpose of the blurring is to sum the outer products $x^T x$ and $x^T y$ over a local neighbourhood centred on the pixel of interest, to generate the moment matrices $X^T X$ and $X^T Y$. Optionally the sum may be a weighted sum, typically emphasizing the contribution of pixels in the centre of each neighbourhood and de-emphasizing the contribution of peripheral pixels of the neighbourhood. There are various ways to implement this efficiently. In one example, the calculation of the moment matrices is accelerated by reusing computations between overlapping regions and taking advantage of fast image filtering techniques. Let each pixel in X be represented by a row vector x, and each pixel in Y by a row vector y. Calculate $x^T x$ and $x^T y$, the outer products, for every output location. Considered over the whole image, this gives 4D tensors with example dimensions [H,W,N,N] and [H,W,N,M], where H and W are the image height and width, and N and M are the numbers of channels in X and Y, respectively. Convolve a 2D box filter across the first two dimensions in these tensors. This box filter can be implemented using an integral image or separable horizontal and vertical kernels for efficiency. This can be shown to be equivalent to building the moments matrices:

$$\{X^T X\}_{i,j} = X^T_{:,i} X_{:,j} = \sum_p X_{p,i} X_{p,j} = \left\{ \sum_p X^T_{p,:} X_{p,:} \right\}_{i,j},$$

$$X^T X = \Sigma_p X^T_{p,:} X_{p,:}.$$

Here, $\{X\}_{i,j}$ is the element on the $j^{th}$ row and $i^{th}$ column of the matrix X. $X_{p,:}$ is the row vector that is the $p^{th}$ row of X. $X_{:,i}$ is the column vector that is the P' column of X. In this way, the moment matrix $X^T X$ can be written as the sum of the outer products of the rows of X. Due to the overlap between local neighbourhoods and the fact that linear filters can be computed cheaply, it is efficient to construct it in this way. A similar formulation applies to the second moment matrix $X^T Y$.

The filter described above implements simple box filtering. This can be accelerated in a number of ways. One option is to use integral images (also known as summed area tables) to precompute the sums of the outer products up to and including every pixel in the low resolution image. The sum of the outer products in an arbitrary desired area can then be derived from the integral image, based on the integral values at four corners of a rectangle.

Another option is to use the so-called "running box filter". This works on the principle that successive sums of outer products can be calculated incrementally for each shift of a window defining the local neighbourhood, by adding the values that have come into the window and subtracting values that have fallen out of it. This can be understood better by reference to a simple one-dimensional example. Assume it is desired to calculate the three pixel box filter along a row of pixels a, b, c, d, e. The first sum is a+b+c. The second sum is b+c+d. This can be calculated by taking the preceding value (a+b+c), adding d (which comes into the window) and subtracting a (which falls out of the window). This gives the computation (a+b+c)+d−a=b+c+d. The process is repeated at the next step: (b+c+d)+e−b=c+d+e. Note that, although this does not change the number of calculations at each shift of the window, for this simplified, three-pixel example, it has considerable benefits for larger box filters. The desired summation can be calculated, at each shift, by a single subtraction and a single addition—irrespective of the filter size. The possibility of separable 1-D horizontal and vertical box filtering, discussed above, can be combined with the use of a running box filter. That is, the running box filter can be implemented separably in two dimensions.

Although a box filter is efficient to compute, it gives equal weighting to all pixels in the local neighbourhood. Better results may be achieved by giving pixels close to the centre of the neighbourhood more influence than those at the edges. The challenge is to find efficient ways to implement this more complex kind of filtering, to achieve a good balance between computational efficiency and image quality.

One approach that offers good potential to reconcile these competing requirements is to use mipmaps to implement the blurring. Mipmapping as such is known in the computer graphics literature, where it has been applied in the context of texture sampling. It uses a scale space pyramid, in which each level of the pyramid (sometimes referred to in the art as a "chain") is produced by downsampling the preceding level. In some examples, each level of the pyramid is produced from the preceding level by a 2×2 box filter. This can be computed recursively by a bilinear resampling of the preceding layer. The present inventors have recognised that a mipmap pyramid can be computed for each channel of the outer products, and these mipmaps can then be used to support an efficient implementation of the blurring. Sometimes, it is not necessary to compute all levels of the mipmap pyramid (as discussed in more detail below). This can allow time, power, memory, and bandwidth to be saved.

Figure 6A:
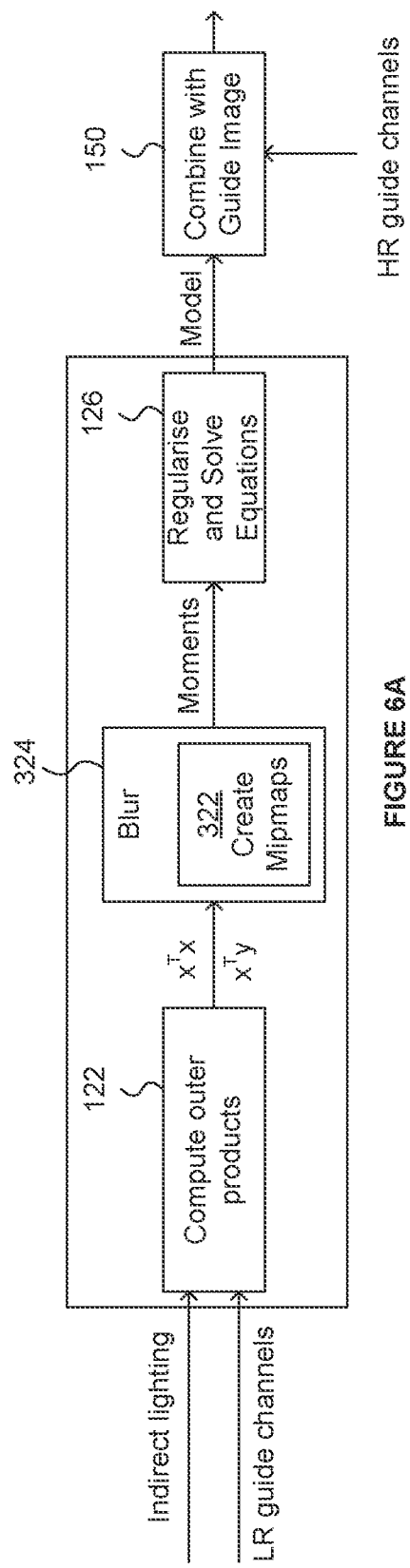
FIG. 6A shows a variant of the model-fitting method illustrated in FIG. 3.
Figure 6B:
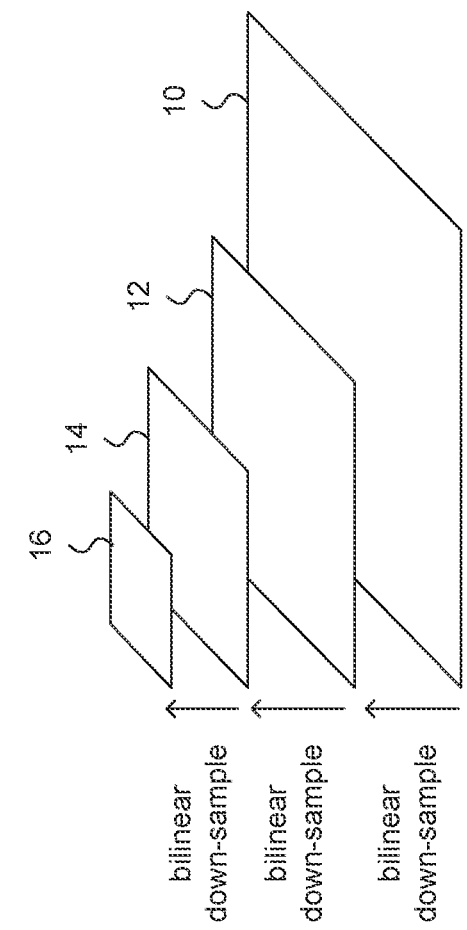
FIGS. 6B and 6C illustrate the creation of a mipmap pyramid according to an example.
Figure 6C:
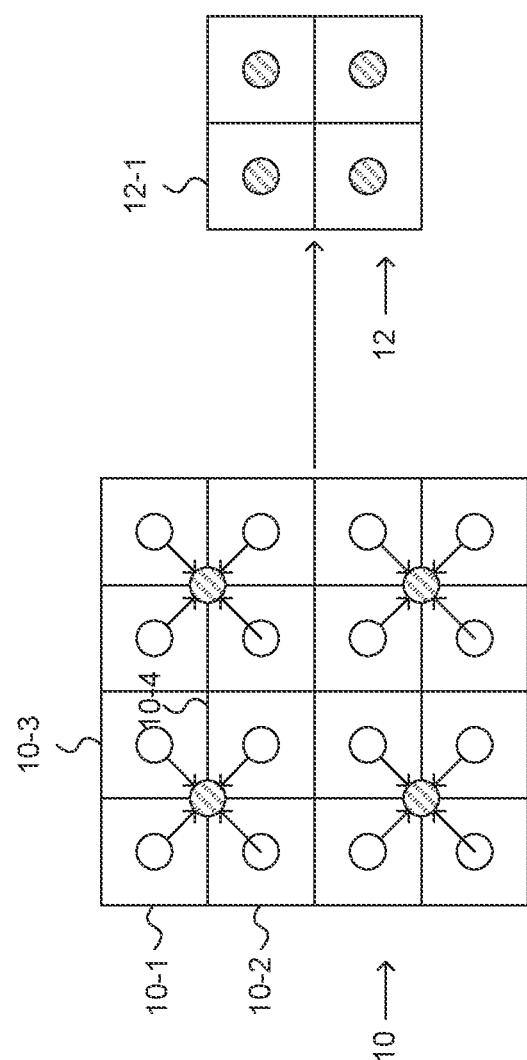

FIG. 6A illustrates a variant of the method of FIG. 3, incorporating the use of mipmapping. In step 122, the model fitting block 220 calculates the outer products (as before); and in step 322 it creates mipmaps from them as part of the blurring process. This process is illustrated in FIG. 6B. At the bottom level of the pyramid is the original outer product tensor 10 (shown as a 2-D array for simplicity, although it is in fact a higher-dimensional tensor). This is spatially (e.g. bilinearly) downsampled to produce the second level 12 of the pyramid. The second level is downsampled to produce the third level 14, and this in turn is downsampled to produce the fourth and final level 16. FIG. 6C is a graphical illustration of the bilinear downsampling when producing the second level from the bottom level. Four pixels, 10-1 to 10-4, of the original outer product array are averaged to produce one pixel 12-1 of the second level of the pyramid. This is repeated for every adjacent 2×2 pixel block of the original outer product array. Each level of the pyramid is therefore approximately one quarter the size of the preceding level. In general, this process may continue to be iterated until one or both spatial dimensions reaches 1, or until a sufficiently low resolution has been reached.

Once the mipmaps have been calculated for each outer product, the blurring operation (step 324) is implemented by selecting the relevant level(s) of the pyramid and sampling appropriately to obtain the blurred version of the outer product. In some examples the blurring consists solely of a sampling operation at an appropriate level of the mipmap pyramid. But in other examples, the blurring can optionally include applying a filter to the samples retrieved from the mipmaps. Because of the reduced resolution of the higher pyramid levels, the mipmaps can enable filtering to be implemented with a smaller number of calculations than if a filter of the same size were to be applied directly to the outer products. The blurred moments output from the blurring step 324 are processed as before, in step 126.

Some examples of implementations based on mipmaps will now be described. Typically, one or more mipmap levels are selected based on the size of the blurring filter kernel that we wish to construct. In some examples, as mentioned above, individual samples from the mipmaps may be used directly to produce the blurred moments. This would implement a relatively simple square blurring filter, with an effective kernel size corresponding to the level of the pyramid that is selected. Note that, if the kernel size is fixed in advance, only a single level of the mipmap pyramid is actually needed. The construction of the mipmaps may be terminated at this level. Alternatively, the required single level could be generated directly (that is, without the need for recursion). In its simplest form, the blurring can be performed based on nearest neighbour sampling, although this may have drawbacks in the form of potential aliasing artefacts.

In other examples, the mipmap pyramid may be sampled bilinearly at a single level of detail. In still other examples, the mipmaps may be sampled between levels using trilinear sampling. This involves bilinear sampling at two successive levels of detail, with a linear interpolation between the results. In still other examples, the mipmaps may be sampled using bicubic sampling. Bilinear, trilinear and bicubic sampling are commonly used in texture-sampling applications of mipmaps, and, because of this, the operations may be hardware-accelerated on some GPUs. This can be exploited to further speed up the blurring calculations.

Figure 7:
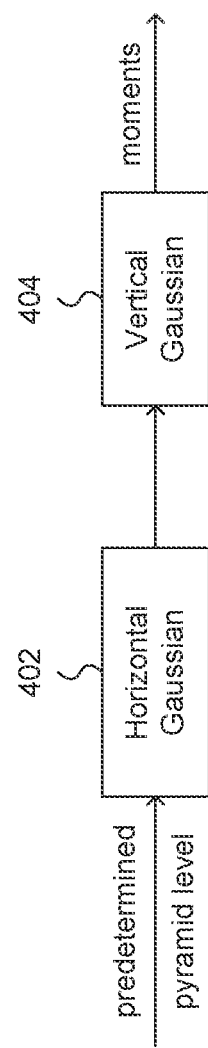
FIG. 7 illustrates an example of the blurring step in FIG. 6A.

The samples extracted from the mipmaps (by any chosen sampling regime) can then be (further) filtered, if desired, to produce the blurred moments—typically using a small low-pass filter kernel. FIG. 7 illustrates one example of blurring 324 in this way. Samples are extracted from a predetermined level of the mipmap pyramid and are filtered firstly with a horizontal Gaussian filter 402 and secondly with a vertical Gaussian filter 404. Separable filtering in this way, using two successive, orthogonal, one-dimensional filters, can further decrease the computational complexity, and increase the speed. The use of Gaussian kernels is one example of giving greater weight to samples in the centre of the neighbourhood than those at the edges. Other examples are possible. An infinite impulse response (II R) filter could be used instead of a Gaussian, for instance.

Figure 8A:
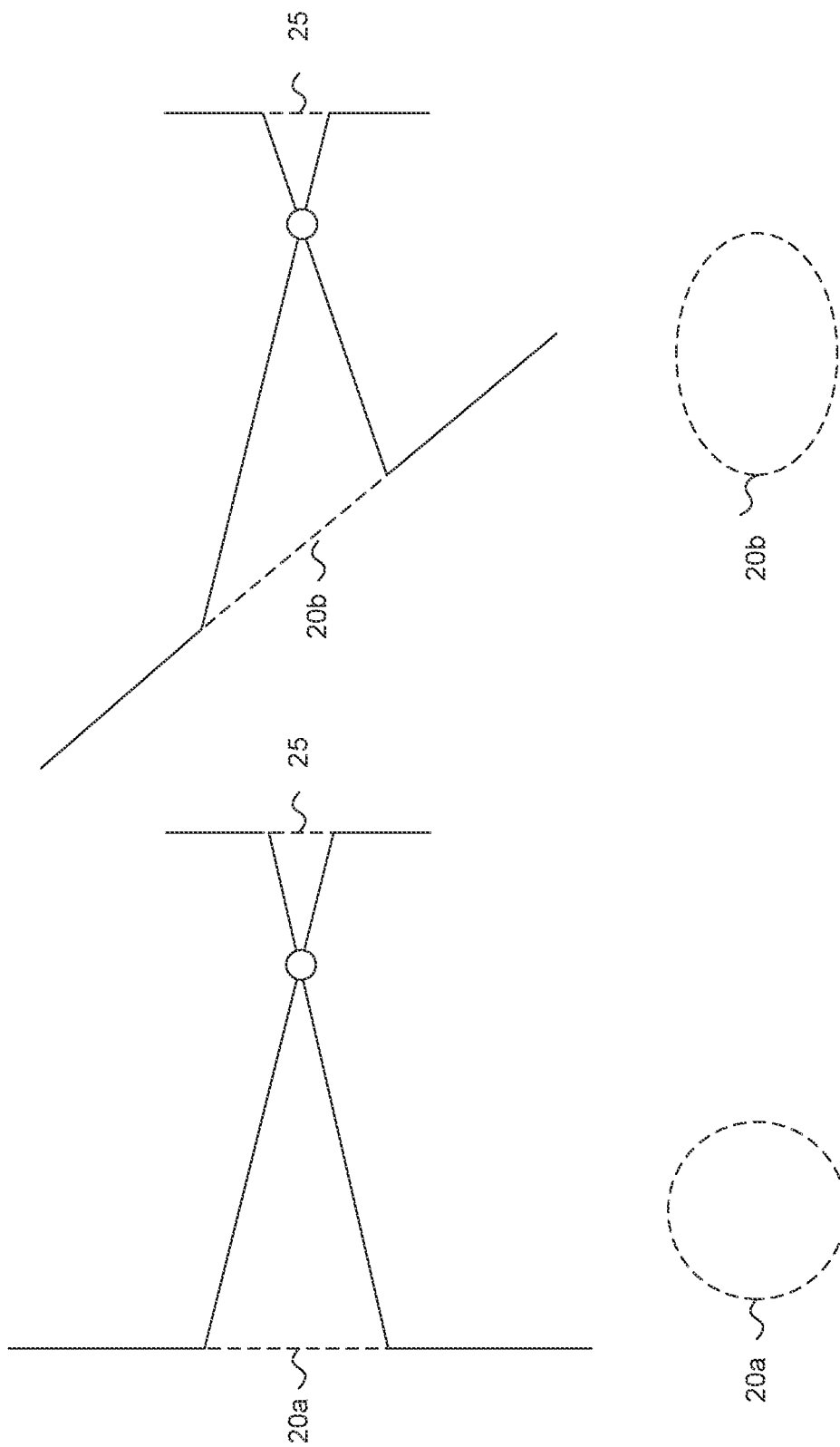
FIG. 8A illustrates a rationale for anisotropic blurring.
Figure 8B:
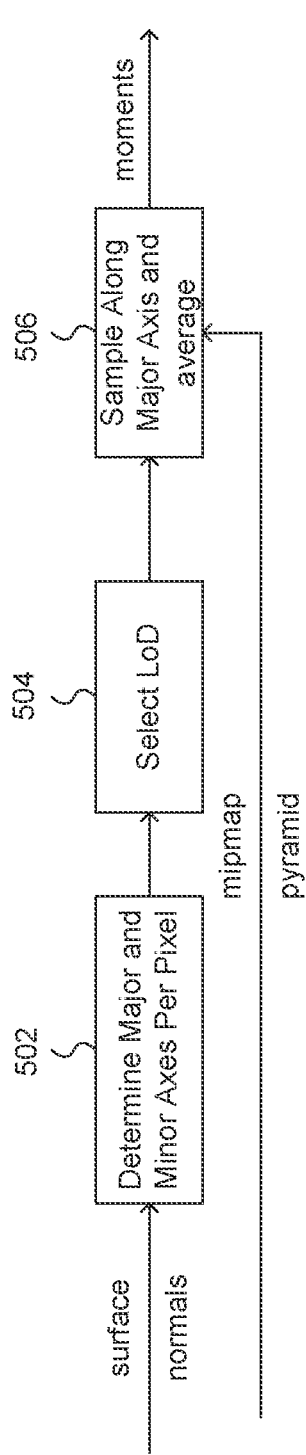
FIG. 8B illustrates another example of the blurring step in FIG. 6A.

FIGS. 8A and 8B illustrate another example of blurring assisted by mipmaps. The present inventors have found that it can be advantageous to take scene content into account when performing the blurring. In particular, it is advantageous to take into account the orientation of surfaces relative to the virtual camera. The reason for this is illustrated in FIG. 8A. A circular region 25 on the image plane maps to a circular region 20a on a plane in the scene, when the plane in the scene is parallel to the image plane. However, the same circular region 25 on the image plane maps to an elliptical region 20b on a plane in the scene, when the plane in the scene is not parallel to the image plane. It is advantageous for the blurring to take this into account. Rather than using a blurring kernel that is isotropic (height=width) throughout the image, the shape of the kernel can be anisotropic (height≠width) and can be adapted locally to the orientation of the surface over which the blurring is being performed. The aim is to ensure that the projection of the kernel onto the scene is approximately constant and isotropic in scene space.

FIG. 8B illustrates a method that applies this principle, assisted by the mipmaps created in step 322. In step 502, the model fitting block 220 determines the size and orientation of the appropriate major and minor axes of the filter footprint on the image plane, according to the scene content at every pixel location. This is obtained from a combination of screen space surface normal (available, for example, from the relevant guide channels) and the filter kernel size. The major and minor axis do not need to be axis-aligned (that is, horizontal and vertical). Anisotropic filtering will be performed based on the determined major and minor axes, as described in the following example. In step 504, the model fitting block 220 selects the appropriate level of detail in the mipmap pyramid, for example by calculating log 2 (minor axis length in pixels). In general, this is not necessarily an integer value. It can either be rounded to the nearest integer, or trilinear sampling can be used to obtain a level of detail between levels of the pyramid. In step 506, the model fitting block 220 identifies points along the length of the major axis at the level of detail selected in step 504. It extracts outer product samples from the mipmap at the specified level of detail, by appropriate sampling. This may be, for example, point sampling, bilinear sampling, or bicubic sampling. The output of step 506 is the average of the sampled points along the major axis. This is repeated for each pixel. In some examples, the average may be a weighted average with greater weight near the centre of the kernel. The weights of the weighted average need not sum to one.

Of course, it should be understood that use of mipmaps/multiscale pyramids is just one way to implement the blurring efficiently. Other efficient filtering approaches are possible. An IIR filter that is suitable for efficiently implementing the blurring is described in GB 2541179 A, for example.

Normalization

As explained above, a regularization is added to the moment matrix $X^TX$ before matrix inversion, in order to increase numerical stability. However, the inventors have found that it is advantageous not to rely entirely on the regularization to avoid numerical instability. Better quality rendering results can be achieved by (alternatively or additionally) normalizing the moment matrices. In the present example, both moment matrices are normalized so they appear as if they were generated from data having zero mean and unit standard deviation. This is achieved by extracting mean and standard deviation statistics from the original moment matrix. The first moment matrix $X^TX$ can be partitioned as:

$$X^TX = \begin{pmatrix} X^TX_{1,1} & X^TX_{1,2:} \\ X^TX_{2:,1} & X^TX_{2:,2:} \end{pmatrix} = \begin{pmatrix} N & N\mu_X \\ N\mu_X^T & N(\sigma_X^T\sigma_X \cdot \hat{X}^T\hat{X} + \mu_X^T\mu_X) \end{pmatrix}.$$

The normalized version can be extracted by the calculation:

$$\hat{X}^T\hat{X} = \frac{\frac{X^TX_{2:,2:}}{N} - \mu_X^T\mu_X}{\sigma_X^T\sigma_X}.$$

Where $$\sigma_X = \sqrt{\text{diag}\left(\frac{X^TX_{2:,2:}}{N} - \mu_X^T\mu_X\right)}$$

Here, μ is the mean, and σ is the standard deviation of the data X. Similarly, the second moment matrix $X^TY$ can be rewritten as:

$$X^TY = \begin{pmatrix} X^TY_{1,1:} \\ X^TY_{2:,1:} \end{pmatrix} = \begin{pmatrix} N\mu_Y \\ N(\sigma_X^T\mathbf{1} \cdot \hat{X}^TY + \mu_X^T\mu_Y) \end{pmatrix}.$$

Where 𝟙 is a row vector of 1s of a compatible length.

From which the normalized version can be extracted as:

$$\hat{X}^TY = \frac{\frac{X^TY_{2:,1:}}{N} - \mu_X^T\mu_Y}{\sigma_X^T\mathbf{1}}.$$

The model is constructed from the normalized matrices instead of the original moment matrices. The transformations used for normalization should be reversed when later applying the model in the model combination block 250. In particular, the model combination block calculates the product XA by applying the "normalized" model parameters A as follows:

$$xA = x\hat{A} - \mu_X^T\hat{A} + \mu_Y^T.$$

Normalization has been found to help reduce unwanted blurring across structural boundaries in the scene (helping to avoid "glow" around objects, for example) as well as reducing noise from badly conditioned matrices.

Quantization

Figure 9:
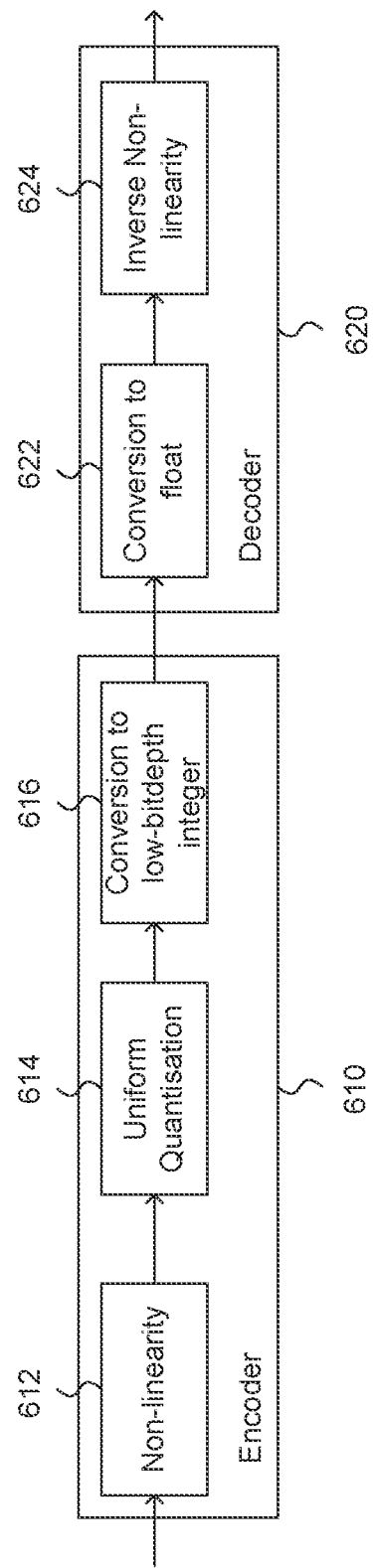
FIG. 9 illustrates quantization and inverse quantization of data, according to an example.

Memory access bandwidth and storage may be further reduced by quantizing data for transfer to and from the GPU. Although it may be beneficial to perform calculations in a floating point format, it may be possible to store and transfer the data in low-bitdepth integer formats. This can reduce the bandwidth required for transferring the data between the GPU and memory. Memory access bandwidth is a particularly precious resource when transferring data to an off-chip memory. Experiments have shown that the guide image can be stored in 8-bit integer format (signed or unsigned, as appropriate for the numerical range of each guide channel). The image quality of the resulting denoised images is closely comparable to that achieved using floating point guide channels. Experiments have shown that greater care may be required with lighting images. In particular, direct (linear) quantization has been found to produce sub-optimal results in terms of the quality of the denoised output images. The inventors have discovered that the use of non-linear quantization can give better results in this context, while still achieving a reduction in memory access bandwidth. FIG. 9 illustrates one way of encoding 610 and decoding 620 a lighting image, for use in the rendering method of the present example. This may be applied in particular to the noisy indirect lighting image produced by the path-tracing block 210. However, it may also be applied to other lighting images, such as the direct lighting image produced by the ray tracing block 260, as well as to the final rendered output image. In step 612, a nonlinearity is applied to the floating point lighting image. That is, the input floating point values are transformed to by mapping them to second floating point values, using a nonlinear function. The transformed input values are then subjected to uniform quantization in step 614. The combination of the nonlinearity and the uniform quantization is to provide a greater density of quantization levels for darker regions of the image, while lighter regions of the image are quantized relatively sparsely. Suitable nonlinearities for achieving this effect include a square root function and a logarithm function. Following quantization in step 614, the quantized floating point numbers are converted to low-bitdepth integers in step 616. The low-bitdepth integers are then transferred from the GPU to the memory (for example, an on-chip or external memory). The quantization reduces both the amount of data to be stored in the memory and, more importantly, the bandwidth required to transfer the data to and from the memory. In the present implementation, the low-bitdepth integers are stored with a bitdepth of 8 bits. However, different low-bitdepth formats may be used for different guide channels and/or the noisy image. That is, during any given process to produce a denoised image, the different guide channels and the noisy image need not use the same low-bitdepth format—they can be encoded and decoded independently to and from different formats. This may be advantageous, for example, if it were found to be beneficial to the overall result to use more bits for the depth than for the surface normal components.

When the data is needed (for example, when it is retrieved from the memory for the calculation of the inner products), it is decoded 620 to invert the nonlinear quantization. In step 622, the low-bitdepth integers are converted back to floating point numbers. Then, in step 624, an inverse nonlinearity is applied, to reverse the effect of the nonlinear function in step 612. For example, if a square root function was applied in step 612, a quadratic (squaring) function would be applied in step 624. If a logarithmic function was applied in step 612, the function applied in step 624 will involve an exponential.

The denoised output image may also be quantized, after it is produced. This provides similar benefits as explained above, i.e. a saving of bandwidth when outputting the denoised image, by outputting it at a lower bitdepth (compared to without the quantization step). This can be particularly beneficial because the denoised output is usually significantly larger than the noisy, low-resolution, input and therefore would represent a significantly larger bandwidth load if output in a non-quantized manner.

Alternative Pipelines

Figure 10:
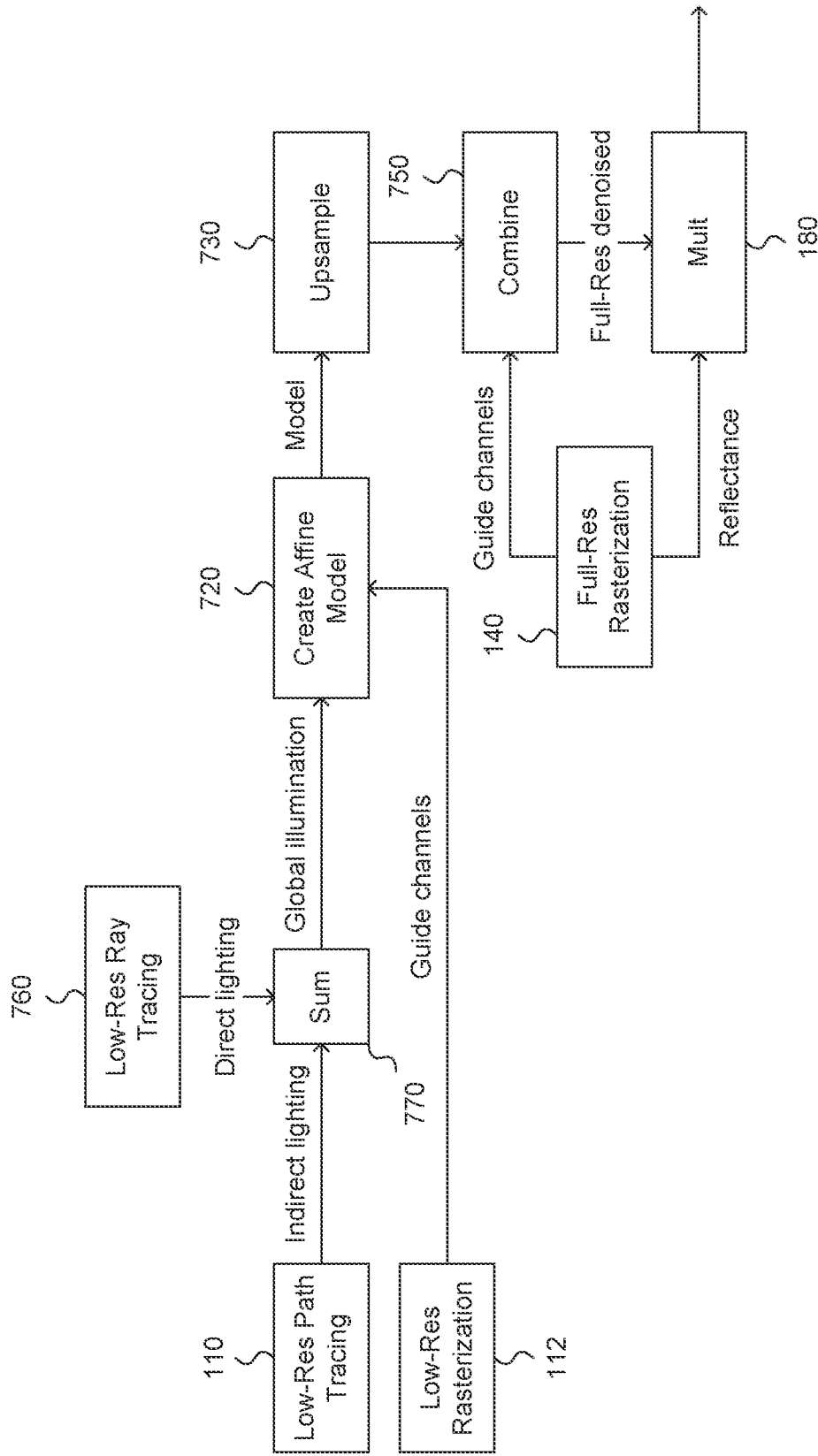
FIG. 10 is a flowchart illustrating an alternative to the method of FIG. 1, according to another example.

The pipeline illustrated in FIG. 1 is not the only way to render images using low resolution denoising by guided filtering. FIG. 10 illustrates another example. FIG. 10 differs from FIG. 1 in that the noisy low resolution indirect lighting image is combined with a direct lighting image before the denoising procedure. In steps 110 and 112, as before, the low resolution noisy indirect lighting image is rendered by path tracing and the low resolution guide channels are rendered by rasterization. However, instead of rendering a full resolution direct lighting image in step 160, the ray tracing block renders a low resolution direct lighting image in step 760. The low resolution direct lighting and low resolution indirect lighting images are summed in step 770. The resulting global illumination image is noisy because it includes the indirect lighting. This noisy image is passed to the model fitting block and the model parameters are estimated, in step 720, in the same way as described above for step 120. The resulting model parameters, which are produced at low resolution, are up-sampled in step 730 and combined with the full resolution guide channels in step 750. This produces a full resolution denoised global illumination image. In step 180, just as in FIG. 1, this global illumination image is combined with the surface reflectance image to produce the final rendered output image. For best results with the pipeline of FIG. 10, the low resolution images would preferably be the same size (same resolution) as the full resolution images. Otherwise, there is a risk of sub-optimal reconstruction of shadow edges, with unwanted blurring being introduced across these edges.

In another variation of the pipeline, the ray tracing 160 or 760 may be replaced by rasterization, optionally using shadow mapping, for example.

Referring again to the pipeline of FIG. 1, it was explained above that the "full-resolution" images have a resolution that is greater than or equal to the resolution of the "low-resolution" images. When the "low-resolution" images have the same resolution as the "full resolution" images, it should be understood that the rasterizations in steps 112 and 140 may be performed in a single step, since the same set of guide channels is used when calculating the model parameters and applying them. Alternatively, they may still be performed as two steps (exactly as shown in FIG. 1) wherein step 140 repeats the rasterization of the guide channels that was performed in step 112.

Alternative Lighting Models

Although the examples above combined direct and indirect lighting images to provide global illumination, this is not the only possible implementation. For instance, in other examples, instead of an indirect lighting image, a low resolution path tracing step similar to step 110 may implement ray-traced ambient occlusion. This is a simplified approximation to indirect illumination, but it still depends on stochastic sampling; therefore, the resulting path-traced image is still noisy and can benefit from the combined rendering and denoising pipeline. Either the pipeline of FIG. 1 or that of FIG. 10 can be used with ray traced ambient occlusion.

In some examples using ray-traced ambient occlusion, a direct lighting image is combined with the image produced by ray-traced ambient occlusion at some stage of the pipeline. This would be the case using pipelines similar to those in both FIG. 1 and FIG. 10, for instance. However, this is not essential. This method may be part of a larger rendering pipeline that—for example—uses more complex rasterization techniques than simply combining with direct lighting.

Alternative Model Fitting

Although the examples above modelled the noisy input image as a linear combination of guide channels, in an affine model, the scope of the present disclosure is not so limited. Other models may be used, including for example nonlinear/higher-order models. One example of such a higher order model would be a quadratic fit. A quadratic model can be implemented by including the square of any of the channels in the guide image.

System

Figure 11:
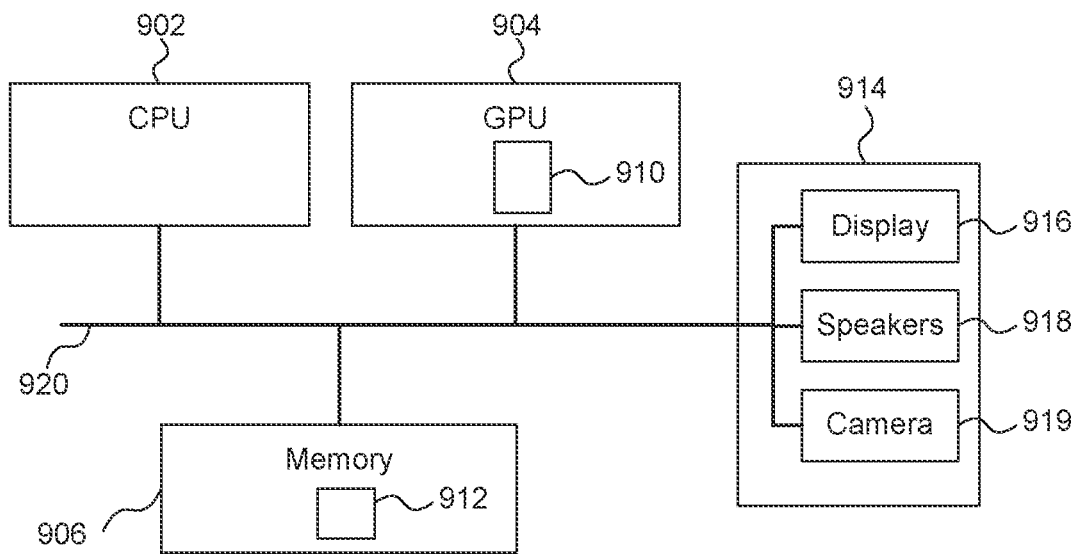
FIG. 11 shows a graphics processing system in which a graphics processing unit is implemented.

FIG. 11 shows a graphics processing system in which the graphics processing units described herein may be implemented. The computer system comprises a CPU 902, a GPU 904, a memory 906 and other devices 914, such as a display 916, speakers 918 and a camera 919. A processing block 910 (corresponding to processing blocks 210-280) is implemented on the GPU 904. In other examples, the processing block 910 may be implemented on the CPU 902. The components of the computer system can communicate with each other via a communications bus 920. A store 912 (corresponding to store 112) is implemented as part of the memory 906.

While FIG. 9 illustrates one implementation of a graphics processing system, it will be understood that a similar block diagram could be drawn for an artificial intelligence accelerator system—for example, by replacing either the CPU 902 or the GPU 904 with a Neural Network Accelerator (NNA), or by adding the NNA as an additional unit. In such cases, the processing block 910 can be implemented in the NNA.

The GPU of FIG. 2 and the methods/pipelines of FIGS. 1 and 10 are shown as comprising a number of functional blocks. This is schematic only and is not intended to define a strict division between different logic elements of such entities. Each functional block may be provided in any suitable manner. It is to be understood that intermediate values described herein as being formed by a GPU need not be physically generated by the GPU at any point and may merely represent logical values which conveniently describe the processing performed by the GPU between its input and output.

The GPUs and graphics processing systems described herein may be embodied in hardware on an integrated circuit. The GPUs and graphics processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing system configured to perform any of the methods described herein, or to manufacture a graphics processing system comprising any apparatus described herein. An integrated circuit definition dataset may be, for example, an integrated circuit description.

Therefore, there may be provided a method of manufacturing, at an integrated circuit manufacturing system, a graphics processing system as described herein. Furthermore, there may be provided an integrated circuit definition dataset that, when processed in an integrated circuit manufacturing system, causes the method of manufacturing a graphics processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system will now be described with respect to FIG. 12.

Figure 12:
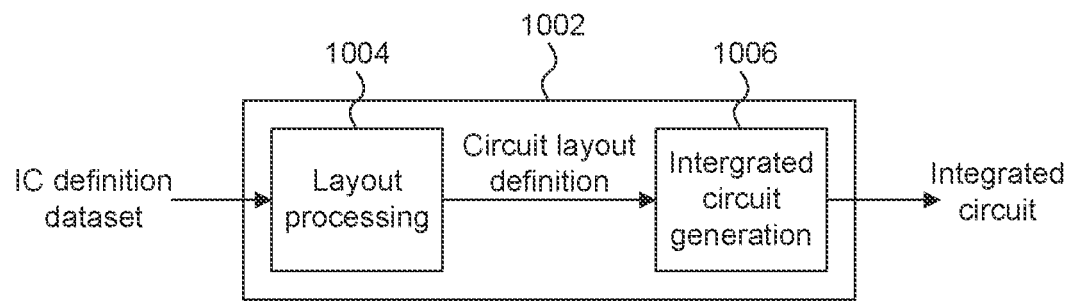
FIG. 12 shows an integrated circuit manufacturing system for generating an integrated circuit embodying a graphics processing system.

FIG. 12 shows an example of an integrated circuit (IC) manufacturing system 1002 which is configured to manufacture a graphics processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing system as described in any of the examples herein), process the IC definition dataset, and generate an IC according to the IC definition dataset (e.g. which embodies a graphics processing system as described in any of the examples herein). The processing of the IC definition dataset configures the IC manufacturing system 1002 to manufacture an integrated circuit embodying a graphics processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of rendering an image of a 3-D scene, the method comprising:
rendering a noisy image;
obtaining one or more guide channels; and
for each of a plurality of local neighbourhoods:
calculating the parameters of a model that approximates the noisy image as a function of the one or more guide channels, and
applying the calculated parameters to produce a denoised image,
wherein calculating the parameters of the model comprises:
defining a first tile, defining respective first contiguous portions of the noisy image and the one or more guide channels, each comprising a first plurality of pixels;

defining a second tile, defining respective second contiguous portions of the noisy image and the one or more guide channels, each comprising a second plurality of pixels;

calculating a first outer product between each pixel in the one or more guide channels and itself; and calculating a second outer product between each pixel in the one or more guide channels and the corresponding pixel in the noisy image, wherein the first outer product and second outer product are calculated for pixels in the first tile either (i) before the second tile or (ii) concurrently with the second tile.

2. The method of claim 1, wherein rendering the noisy image comprises rendering by path tracing.

3. The method of claim 1, wherein the noisy image comprises (i) indirect lighting in the scene or (ii) an ambient occlusion image.

4. The method of claim 3, wherein the denoised image is a denoised indirect lighting image or a denoised ambient occlusion image, and wherein the method further comprises:
obtaining a direct lighting image; and
combining the denoised image with the direct lighting image to produce a global illumination image.

5. The method of claim 4, wherein obtaining the direct lighting image comprises rendering it by ray-tracing or rendering it by rasterization.

6. The method of claim 3, wherein the noisy image is a noisy global illumination image, comprising direct and indirect lighting in the scene, whereby the denoised image is a denoised global illumination image.

7. The method of claim 4, further comprising combining the global illumination image or the denoised global illumination image with a surface reflectance image to produce a rendered image of the 3-D scene.

8. The method of claim 1, wherein obtaining the one or more guide channels comprises rendering by rasterization.

9. The method of claim 1, wherein the guide channels comprise any one or any combination of two or more of:
depth information of objects in the 3-D scene;
information identifying materials of objects in the 3-D scene;
surface reflectances of objects in the 3-D scene;
shadows in the 3-D scene; and
surface normals of objects in the 3-D scene.

10. The method of claim 1, wherein calculating the parameters of the model comprises:
calculating a first outer product between each pixel in the one or more guide channels and itself;
calculating a second outer product between each pixel in the one or more guide channels and the corresponding pixel in the noisy image;
blurring the first outer products to calculate a first moment matrix for each local neighbourhood;
blurring the second outer products to calculate a second moment matrix for each local neighbourhood; and
calculating the parameters of the model for each local neighbourhood, comprising calculating an inverse matrix of the first moment matrix, and calculating a product of the inverse matrix and the second moment matrix.

11. The method of claim 10, wherein blurring the first outer products comprises calculating a first multiscale pyramid from the first outer products and calculating the first moment matrix based on the first multiscale pyramid; and/or wherein blurring the second outer products comprises calculating a second multiscale pyramid from the second outer products and calculating the second moment matrix based on the second multiscale pyramid.

12. The method of claim 10, wherein the blurring comprises separable filtering in horizontal and vertical directions.

13. The method of claim 10, wherein the blurring comprises filtering using an anisotropic 2-D filter.

14. The method of claim 11, wherein the one or more guide channels include surface normals of objects in the 3-D scene, and wherein the blurring comprises:
for each local neighbourhood,
determining a major axis and minor axis of a 2-D filter, based on the surface normal of the object at the centre of the neighbourhood;
selecting a level of the multiscale pyramid, based on the length of the minor axis; and
sampling the selected level of the multiscale pyramid along the major axis.

15. The method of claim 10, wherein the blurring comprises one of:
IIR filtering; and
filtering with a running box filter.

16. The method of claim 10, comprising:
defining a first outer product tile, defining a first contiguous portion of the first outer product and a respective first contiguous portion of the second outer product, each comprising a first plurality of pixels; and
defining a second outer product tile, defining a second contiguous portion of the first outer product and a respective second contiguous portions of the second outer product, each comprising a second plurality of pixels,
wherein the first moment matrix and second moment matrix are calculated for the first tile either (i) before the second tile or (ii) concurrently with the second tile.

17. The method of claim 10, further comprising normalizing and/or regularizing one or both of the first moment matrix and the second moment matrix.

18. A non-transitory computer readable storage medium having stored thereon computer readable code configured to cause the method as set forth in claim 1 to be performed when the code is run.

19. A method of rendering an image of a 3-D scene, the method comprising:
rendering a noisy image;
obtaining one or more guide channels; and
for each of a plurality of local neighbourhoods:
calculating the parameters of a model that approximates the noisy image as a function of the one or more guide channels, and
applying the calculated parameters to produce a denoised image,
wherein calculating the parameters of the model comprises:
calculating a first outer product between each pixel in the one or more guide channels and itself;
calculating a second outer product between each pixel in the one or more guide channels and the corresponding pixel in the noisy image;
blurring the first outer products to calculate a first moment matrix for each local neighbourhood;
blurring the second outer products to calculate a second moment matrix for each local neighbourhood; and
calculating the parameters of the model for each local neighbourhood, comprising calculating an inverse matrix of the first moment matrix, and calculating a product of the inverse matrix and the second moment matrix, the method comprising, when blurring the first and second outer products:

defining a first outer product tile, defining a first contiguous portion of the first outer product and a respective first contiguous portion of the second outer product, each comprising a first plurality of pixels; and defining a second outer product tile, defining a second contiguous portion of the first outer product and a respective second contiguous portions of the second outer product, each comprising a second plurality of pixels, wherein the first moment matrix and second moment matrix are calculated for the first tile either (i) before the second tile or (ii) concurrently with the second tile.

20. A non-transitory computer readable storage medium having stored thereon computer readable code configured to cause the method as set forth in claim 19 to be performed when the code is run.

\* \* \* \* \*